United States Patent [19]

Wolf

[11] Patent Number: 5,008,345

[45] Date of Patent: Apr. 16, 1991

[54] NO-POST-CURE METHOD OF CURING POLYACRYLATE POLYMERS

[75] Inventor: Fred R. Wolf, Avon Lake, Ohio

[73] Assignee: Zeon Chemical USA, Inc., Avon Lake, Ohio

[21] Appl. No.: 551,098

[22] Filed: May 18, 1990

Related U.S. Application Data

[63] Continuation of Ser. No. 227,396, Aug. 4, 1988, abandoned, which is a continuation-in-part of Ser. No. 101,883, Sep. 28, 1987, abandoned.

[51] Int. Cl.$^5$ .................................................. C08F 8/40
[52] U.S. Cl. ............................. 525/340; 525/328.2; 525/328.5; 525/328.9; 525/329.5; 525/329.8; 525/355; 525/366
[58] Field of Search ........................ 525/355, 340, 366

[56] References Cited

U.S. PATENT DOCUMENTS 3,875,092  4/1975  Morris .
3,912,672  10/1975 Morris et al. .
3,976,610  8/1976  Morris et al. .
4,650,834  3/1987  Yagishita et al. .

Primary Examiner—Bernard Lipman
Attorney, Agent, or Firm—Daniel J. Hudak Co.

[57] ABSTRACT

A no-post-cure method of curing polyacrylates having dual cure sites is accomplished with a two-part curing system or a combined one-part curing system. The two-part curing system consists of one of more metallic acid salts and an ammonium and/or phosphonium quaternary salt. The one-part curing system consists of an ammonium or phosphonium quaternary acid salt. The polyacrylate rubber must have both a halogen and a carboxyl cure site. The method consists of blending the curative with the polyacrylate rubber and heating the resultant composition until the composition cures. Because the mixed composition is shelf stable, it is not necessary to immediately heat the composition to cure it. The method may optionally include the step of storing the mixed composition until it is desired to cure it.

16 Claims, No Drawings

NO-POST-CURE METHOD OF CURING POLYACRYLATE POLYMERS

CROSS-REFERENCE

This application is a continuation of U.S. Ser. No. 07/227,396, filed Aug. 4, 1988, now abandoned for "No-Post-Cure Method of Curing Polyacrylate Polymers," which is in turn a continuation-in-part of U.S. Ser. No. 101,883, filed Sept. 28, 1987, now abandoned for "No-Post-Cure Method of Curing Polyacrylate Polymers."

FIELD OF THE INVENTION

The present invention pertains to a no-post-cure method for curing polyacrylates having dual cure sites. The cure system consists of a substituted ammonium and/or phosphonium quaternary salt and sometimes an acid acceptor such as an alkali metal salt. The no-post-cure method of the present invention is unique because the polyacrylate rubber, when admixed with the proper amount of the curative, has an extremely long shelf stability so long as it is maintained below the threshold temperature range. When it is desired to cure the polyacrylate polymers having the curative admixed therein, one merely has to raise the temperature to within the threshold temperature range.

BACKGROUND ART

Processes are known for curing polyacrylate polymers having dual cure sites by employing quaternary ammonium salts, for example, as a curative. Exemplary of methods for curing polyacrylate polymers are the following three U S. patents.

U.S. Pat. No. 3,875,092 to Morris discloses acrylate rubbers having both halogen and carboxyl cure sites which are vulcanized using as the only curing agent a quaternary ammonium salt. The vulcanized compositions exhibit good physical properties and low press-cured and post-cured compression sets.

U.S. Pat. No. 3,912,672 to Morris et al discloses a cure system for dual cure site acrylate rubbers. The acrylate rubbers have both halogen and carboxyl cure sites and are vulcanized using an alkali metal salt of a carboxylic acid or an organo-phosphoric acid. The alkali metal salt may be sodium or potassium stearate. The vulcanization can also occur with the addition of a quaternary ammonium salt or an amine to catalyze the vulcanization.

U.S. Pat. No. 3,976,610 to Morris, et al, discloses acrylate rubbers having both halogen and carboxyl cure sites which are vulcanized using an alkali metal salt of a carboxylic or organo-phosphoric acid and an amine-blocked isocyanate. The alkali metal salt may be sodium or potassium stearate. Like the other polyacrylate vulcanizable compositions, these compositions exhibit low press-cured and post-cured compression sets.

None of the above mentioned patents describe a no-post-cure process and do not recognize a temperature threshold effect for polyacrylate rubbers. The following patent does briefly mention the possibility of a no-post-cure process.

U.S. Pat. No. 4,650,834 to Yagishita, et al, describes a vulcanizable elastomer containing an epoxy group as the cure site. The vulcanizable epoxy elastomer also includes a carboxylic acid having at least two carboxyl groups in the molecule. The curative for vulcanizing the elastomer may be either a quaternary ammonium or phosphonium salt. While this patent does mention the possibility of omitting a post-curing stage, none of the examples omit the post-cured stage. Moreover, this reference is completely silent with respect to a good shelf stability and a temperature threshold.

These above references are exemplary of curing processes which require about a 15 to 20 hour post-cure time (even Yagishita, et al, employed a 16 hour post-cure). Acrylate rubbers exhibit favorable qualities of weatherability, high temperature serviceability, and good oil resistance. These qualities make the rubbers useful for automotive and non-automotive applications such as industrial and out-of-door applications. Their use is limited by the tendency of the vulcanizates to post-cure during use. This results in property change and in some cases in failure of the article. To overcome these problems, the acrylate rubber vulcanizates are purposely post-cured, often as long as 24 hours or more, to obtain a more complete cure. This is shown by a reduced compression set. It would be of great advantage to the industry to reduce or eliminate the time required for post-cure. It is of further advantage that the acrylate compounds have long shelf stability. In the past, processing such as compression, injection, or transfer molding; steam autoclave; continuous vulcanization (CV) cure techniques, and the like, have been limited by slow cure and poor shelf stability. These problems are solved by the present invention.

SUMMARY OF THE INVENTION

The no-post-cure method of curing polyacrylates having dual cure site is accomplished using a specific two-part curing system or a combined one-part curing system. The two-part curing system consists of metallic acid salt, and particularly sodium and potassium stearate, along with an alkyl substituted ammonium and/or phosphonium quaternary salt. The polyacrylate rubber must have both a halogen and a carboxyl cure site. The ammonium and/or phosphonium salt have the following formula:

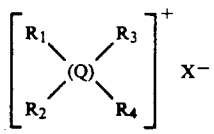

wherein Q is nitrogen or phosphorous, wherein $R_1$, $R_2$, $R_3$ and $R_4$ are hydrocarbon radicals, and wherein X is an anion of an organic or inorganic acid wherein the acidic hydrogen is attached to a halogen or an oxygen atom, and in particular wherein X is a halogen or alkyl, alkaryl or alkoxy acid of the group carboxylic, phosphoric and sulfuric acid.

The two-part curing system consists of a metallic acid salt and a quaternary salt, as described previously. It is believed that when the two-part curing system is uniformly blended and "reacted", the anion from the quaternary salt reacts with the metallic acid salt to form a quaternary acid salt. An example is presented by the following equation:

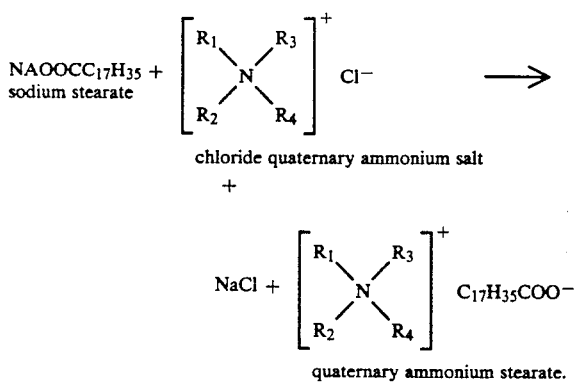

chloride quaternary ammonium salt quaternary ammonium stearate.

Therefore, a one-part curing system may also be employed in the present invention if the quaternary salt is an acid salt as defined above. As an example, $X^-$ can be a stearate $RCOO^-$ and preferably $C_{17}H_{35}COO^-$.

In the broadest sense, the present invention consists of a no-post-cure method of curing a dual site (halogen/carboxyl) polyacrylate elastomer by employing a cure system having an acid such as a metallic acid salt or an organo phosphoric acid and an ammonium and/or phosphonium quaternary salt by blending these components into a uniform composition at a temperature below the threshold or activation temperature range, and heating the composition to within or above the activation or threshold temperature range to cure the polyacrylate elastomer. The quaternary salt could be an acid salt such as a stearate salt.

DETAILED DESCRIPTION

Acrylate rubbers of the present invention which can be cured without a post-cure system are interpolymers comprising acrylate monomer(s), a reactive halogen-containing monomer, and a carboxyl-containing monomer.

The acrylate rubber contains from about 40% to about 99.8% by weight, based upon the weight of the polymer, of an acrylate of the formula:

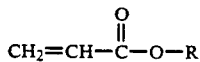

wherein R is an alkyl radical containing 1 to 8 carbon atoms, an alkoxyalkyl or alkylthioalkyl radical containing 2 to about 12 carbon atoms. The alkyl structure can contain primary, secondary, or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate, methylthioethyl acrylate, hexylthioethyl acrylate, and the like; and $\alpha,\beta$-cyanoethyl acrylate, $\alpha,\beta$- and $\delta$-cyanopropyl acrylate, cyanobutyl acrylate, cyanohexyl acrylate, cyanooctyl acrylate, and the like. Often mixtures of two or more monomers and/or types of acrylate monomers can be employed.

Preferably, the rubber contains from about 65% to about 99.6% by weight of acrylates of the formula set forth previously, wherein R is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like, and methoxyethyl acrylate, ethoxyethyl acrylate, and the like. Both an alkyl acrylate and an alkoxyalkyl acrylate can be used.

The rubber contains from about 0.1% to about 30% by weight of an active halogen-containing monomer. The halogen groups can be chlorine, bromine, or iodine. Examples of such monomers are vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ketone, 4-chloro-2-butenyl acrylate, vinyl benzyl chloride, 5-chloromethyl-2-norbornene, 5-$\alpha$-chloroacetoxymethyl)-2-norbornene, 5-($\alpha,\beta$-dichloropropionylmethyl)-2-norbornene, and the like. The preferred monomers are vinyl chloroacetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene.

More preferably, the rubber contains from about 0.2% to about 15% by weight of the active halogen-containing monomer. At this level, the halogen content is from about 0.1% to about 5% by weight of the rubber. Due to the availability and cost, the chlorine-containing monomers are preferred.

The rubbers also contain from about 0.1% to about 20% by weight of a carboxyl-containing monomer. The monomer can be monocarboxylic or polycarboxylic, containing from 3 to about 8 carbon atoms. Examples of such monomers are acrylic acid, methacrylic acid, ethacrylic acid, $\beta,\beta$-dimethylacrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

More preferably the rubber contains from 0.2% to about 10% by weight of the carboxyl-containing monomer. At this level, the carboxyl content is from about 0.1% to about 7% by weight of the rubber. The more preferred monomers are the monocarboxylic acid monomers such as acrylic acid, methacrylic acid, itaconic acid, and the like.

The rubber can contain up to about 35% and preferably up to about 10% by weight of other copolymerizable vinylidene monomers having a terminal vinylidene

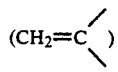

group. Examples of such are phenyl acrylate, cyclohexyl acrylate, methacrylates such as methyl methacrylate, ethyl methacrylate, and the like; vinyl and allyl esters such as vinyl acetate, vinyl propionate, allyl acetate, and the like; vinyl ketones such as methyl vinyl ketone; vinyl and allyl ethers such as vinyl methyl ether, vinyl ethyl ether, allyl methyl ether, and the like; vinyl aromatics such as styrene, $\alpha$-methyl styrene, vinyl toluene, and the like; vinyl nitriles such as acrylonitrile and methacrylonitrile; vinylamides such as acrylamide, methacrylamide, N-methyl methacrylamide, and the like; and dienes and divinyls such as butadiene, isoprene, divinyl benzene, divinyl ether, diethylene glycol diacrylate, and the like. The more preferred copolymerizable monomers are vinyl acetate, methyl methacrylate, ethyl methacrylate, styrene, acrylonitrile, acrylamide, divinyl benzene, and diethylene glycol diacrylate.

The acrylate rubbers can be prepared using emulsion (latex), suspension, solution and bulk techniques known to those skilled in the art. Because it is desirable to polymerize the monomers to 90% conversion or over, emulsion and suspension techniques are usually employed. The polymerization can be performed as a batch reaction or one or more ingredients can be proportioned during the manufacturing process. Temperature of polymerization ranges from about $-10°$ C. to about $100°$ C., whereas a more preferred range is from about $5°$ C. to about $80°$ C.

The polymerization can be initiated by free-radical generating agents. Examples of such agents are organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile, and the like; persulfate salts such as sodium, potassium, and ammonium persulfate, used alone or with redox systems; and the use of utraviolet light with photo-sensitive agents such as benzophenone, triphenylphosphine, organic diazos, and the like.

Typical emulsion polymerization ingredients would include a persulfate salt or organic peroxide and usually a redox system, water adjusted to the desired pH with acids or basis and usually buffered with inorganic salts, and either anionic, cationic, or nonionic surface active agents well known in the art.

The polymerization normally is continued until about 90% conversion of the monomers is obtained. The resulting latex (if the emulsion process is employed) can be coagulated to isolate the polymer. Typical coagulation procedures are salt-acid coagulations, use of polyvalent metal salts such as magnesium sulfate ($MgSO_4$) or calcium chloride, use of alcohols such as methanol, isopropyl alcohol, and freeze agglomeration techniques. The rubber is then usually washed with water and dried.

The acrylate rubbers have raw polymer Mooney values (ML-4 at $212°$ F.) from about 20 to about 100.

The rubbers are admixed with cure ingredients and compounding ingredients using conventional equipment such as a Banbury mixer, extruders, and the like.

When preparing a vulcanizable composition, the polymer is mixed with the curing agents in the Banbury mixer, or other conventional equipment. The vulcanizable composition, in addition to the curing system and the polymers, may also include conventional carbon blacks, other fillers, antioxidants, emulsifiers, plasticizers, retarders, accelerators, and the like conventionally known in the art.

The two-part cure system of the present invention consists of a metallic acid salt and an alkyl substituted ammonium and/or phosphonium quaternary salt. The metallic acid salt can be a carboxylic acid containing from 2 to about 24 carbon atoms and organophosphorus acids of the formula $$(R-O)_z PO_y M$$

where M is an alkali metal, y equals 1 or 2, z equals 1 or 2, and y plus z equals 3, and R is selected from the group consisting of alkyl radicals containing from 1 to about 24 carbon atoms, and an aryl radical containing from 6 to about 24 carbon atoms. Specific examples of suitable metallic acid salts include carboxylic acid salts such as stearic, acetic, butyric, lauric, palmetic, oleic, benzoic acids; and organophosphoric acid salts such as alkylphenoxy poly(ethyleneoxy) ethyl phosphate. More specific acid salts include sodium stearate, potassium stearate, copper stearate, or the like.

The substituted ammonium and/or phosphonium quaternary salts are salts in which all four hydrogen atoms of ammonium or phosphonium have been replaced with organic radicals. The quaternary ammonium or phosphonium salts have the structure

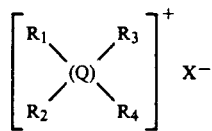

wherein Q is nitrogen or phosphorous, wherein $R_1$, $R_2$, $R_3$ and $R_4$ are hydrocarbon radicals containing 1 to about 18 carbon atoms such as alkyl, aryl, alkaryl, aralkyl radicals, or wherein two or three of the $R_1$, $R_2$, $R_3$ and $R_4$ form with the nitrogen or phosphorous atom a heterocyclic structure containing 3 to 8 atoms selected from the group consisting of carbon, nitrogen, oxygen and sulfur wherein at least two atoms are carbon; and X is an anion of an organic or inorganic acid wherein the acidic hydrogen is attached to a halogen or an oxygen atom, and in particular wherein X is a halogen or alkyl, alkaryl or alkoxy acid of the group carboxylic, phosphoric and sulfuric acid. More specific examples of such anions include chlorine ($Cl^-$), bromine ($Br^-$), iodine ($I^-$), or hydroxide ($OH^-$), sulfuric acid ($HSO_4$), phosphoric acid ($H_2PO_4$), carboxylic acid ($RCOO^-$), organosulfuric acid ($ROSO_3$ or $RSO_3$), and organo-phosphoric acid ($ROPO_3H$) where in the last examples R is an alkyl or alkaryl radical containing from 1 to about 18 carbon atoms.

In the one-part cure system of the present invention, the metallic acid salt is not employed and the ammonium or phosphonium quaternary salt must be a carboxylic or organophosphoric acid salt. Specifically the curative is an ammonium or phosponium quaternary acid salt wherein the acid is either a carboxylic acid containing from 2 to about 24 carbon atoms or an organophosphorus acid of the formula $$(R-O)_z PO_y M$$

where M is the ammonium or phosphorium quaternary salt, y equals 1 or 2, z equals 1 or 2, and y plus 2 equals 3, and R is selected from the group consisting of alkyl radicals containing from 1 to about 24 carbon atoms, and an aryl radical containing from 6 to about 24 carbon atoms. Preferably, in the one-part cure system, X is a stearate ion of the formula $RCOO^-$, and more preferably $C_{17}H_{35}COO^-$. The preferred quaternary ammonium or phosphonium stearate salt has the following formula:

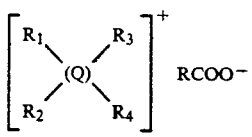

wherein Q is nitrogen or phosphorous, and wherein $R_1$, $R_2$, $R_3$, and $R_4$ are the same as previously stated.

Examples of quaternary ammonium salts for the two-part cure system are tetramethyl ammonium chloride, tetramethyl ammonium bromide, trimethylethyl ammonium iodide, trimethylsoya ammonium chloride, trimethylcetyl ammonium bromide, trimethylbenzyl ammonium chloride, dimethylethylcetyl ammonium chloride, dimethyloctylbenzyl ammonium chloride, dimethyloleyl benzyl ammonium chloride, dimethyloctadecylbenzyl ammonium chloride, dimethylphenylbenzyl ammonium bromide, dimethyldibenzyl ammonium bromide, methylethylpropylisobutyl ammonium chloride, (tetradecyl)trimethyl ammonium chloride, methylcetyldibenzyl ammonium bromide, cetylpyridinium chloride, dodecylpyridinium bromide, tetrabutyl ammonium chloride, tetrabutyl ammonium bromide, tetrabutyl ammonium iodide, tetramethyl ammonium hydroxide pentahydrate, cetyldimethylethyl ammonium bromide, cetyltrimethyl ammonium-p-toluenesulfonate, myristyltrimethyl ammonium bromide, and the like.

Examples of quaternary phosphonium salts for the two-part cure system are tetraphenyl phosphonium bromide, hexadecyltributyl phosphonium bromide, tetraphenyl phosphonium chloride, tetraphenyl phosphonium iodide, tetrabutyl phosphonium chloride, tetrabutyl phosphonium bromide, triphenylbenzyl phosphonium chloride, triphenylbenzyl phosphonium bromide, triphenylbenzyl phosphonium iodide, triphenylmethoxymethyl phosphonium chloride, triethylbenzyl phosphonium chloride, tricyclohexylbenzyl phosphonium chloride, and the like.

Examples of quaternary ammonium or phosphonium acid salts employed as the one-part curative are trimethylbenzyl ammonium stearate, trimethylbenzyl phosphonium stearate, trimethylsoya ammonium stearate, trimethylsoya phosphonium stearate, tetramethyl ammonium stearate, tetramethyl phosphonium stearate, cetyltrimethyl ammonium stearate, cetyltrimethyl phosphonium stearate, tetrabutyl ammonium stearate, dimethylphenylbenzyl ammonium stearate, dimethylphenylbenzyl phosphonium stearate, alkylphenoxypoly(ethyleneoxy)ethyl phosphate, and the like.

These quaternary ammonium or phosphonium salts may be used singlely or as a mixture of two or more. The amount of the quaternary ammonium or phosphonium salt is usually 0.1 to 20 parts by weight per 100 parts by weight of the polymer, and preferably 1 to 4 parts. The metallic acid salt employed in the two-part cure system is in the range of 0.1 to 10 parts by weight per 100 parts by weight of the polymer, and preferably 2-6 parts. These ranges have been selected for high vulcanization or curing speeds and excellent processing stability and long term storage stability of the vulcanizable composition with excellent mechanical properties and compression sets when the vulcanizable composition is cured. If the amount of metallic acid salt and quaternary salt is below the specified ranges, vulcanization or curing proceeds very slowly such that it is almost nonexistent. On the other hand, if the amount of metallic acid salt and quaternary salt is above these ranges, the curing or vulcanization speed is extremely fast, allows no processing time and is very scorchy. Additionally, the mechanical properties and the compression sets are greatly reduced.

As previously mentioned, these ingredients may be mixed with conventional equipment such as a Banbury mixer.

As an aspect of the present invention the composition utilized in the present process has "threshold temperature characteristics." By this term it is meant that once a uniform composition has been obtained, the vulcanizable composition will remain shelfstable over long periods of time so long as it is maintained below the threshold temperature. However, once the composition is subjected to this temperature, it will cure relatively rapidly and completely so that a post cure step is not necessary. More specifically, the composition will have a relatively low rate of cure as shown by a low minimum viscosity change over time as long as the composition is maintained below the threshold temperature. In particular, the method of the invention results in a vulcanizable composition having a minimum viscosity change of less than 150 Mooney units over a two-week period as measured by the Mooney Viscometer Large Rotor Test ASTM D1646 at 100° C., and preferably of less than 5 Mooney Units over an eight-week period. However, once the composition is subjected to the threshold temperature, the composition will cure relatively rapidly. The "threshold temperature" criteria means a temperature at which the $t_5$ value measured by the Mooney Viscometer Large Rotor Test (ASTM D1646) increases by 5 points or more in 31 minutes. Moreover, in accordance with the present invention at temperatures above the threshold temperature, the cure will be relatively complete as to eliminate the need for a post-cure step. The completeness of the curing step without the prior art post-cure step is shown by a compression set after 70 hours at 150° C., plied, percent (ASTM Test D395), by equal or less than 80 and preferably equal or less than 40.

The threshold temperature varies for each combination of metallic acid salt and quaternary salt employed. However, the preferred two-part curative is shelf stable if maintained below about 50° C. Generally, for the preferred curatives the threshold temperature ranges from about 90° C. to about 150° C. Above 150° C., most of the vulcanizable compositions cured extremely fast and would be too scorchy to process.

Although it was mentioned previously that the vulcanization rate may be extremely fast if the amount of curative employed is above a certain preferred range, the upper limit of this range may be extended if conventional acrylate polymer retarders are employed. If retarders are employed, the vulcanization rate can be reduced. However, if employing greatly excessive amounts of curative with copious amounts of retarder, the vulcanization rate may be reduced but the physical properties of the resultant polymer are very poor. The best physical properties are obtained when very little retarder is employed. Conventional retarders for polyacrylate polymers are acids, such as citric acid, acetic acid, stearic acid, and the like.

EXAMPLE 1

This example demonstrates the shelf stability of a vulcanizable composition. The following ingredients were uniformly mixed in a Banbury mixer at room temperature (25° C.).

| Ingredients | Parts by Wt. Based Upon 100 phr. | Description |
|---|---|---|
| Polyacrylate rubber | 100 | Polyacrylate with dual cure site chloride/carboxyl |
| Stearic Acid | 1 | Retarder, lubricant |
| Struktol WB-222 | 2 | Ester of saturated fatty acid, process aid |
| N 550, FEF | 75 | Carbon black filler |
| Agerite* Stalite S | 2 | Octylated diphenyl amine, antioxidant |
| Thiokol TP-759 | 6 | Ether/ester, plasticizer |
| Total | 186 parts by weight | |

To 186 parts of the total blend, 5 parts of curative were added, namely: sodium stearate 4 parts by weight, and cetyltrimethyl ammonium bromide 1 part by weight, for a total vulcanizable composition of 191 parts by weight. Once the composition was uniformly mixed by a two roll mill, the Mooney viscosity was determined using a large rotor at 93° C. and 125° C. Additionally, the same vulcanizable composition was tested eight weeks later during which time the sample was maintained at room temperature (25° C.). During testing, the vulcanizable composition was again tested at 93° C. and 125° C. The results are set forth below and indicate that the Mooney viscosity (large rotor) changes very little during the eight week time period thereby indicating a very stable shelf life.

| | Mooney Viscosity, (Large Rotor) | | | |
|---|---|---|---|---|
| | As Is | Remilled | As Is | Remilled |
| | 93° C. Original | | 93° C. 8 Wks. Room Temp. Aging | |
| Min. Visc. | 62 | 49 | 69 | 45 |
| t5 min. | 23.5 | 16.75 | >31 | 16 |
| t35 min. | >31 | >31 | >31 | >31 |
| | 125° C. Original | | 125° C. 8 Wks. Room Temp. Aging | |
| Min. Visc. | 65 | 52 | 74 | 44 |
| t5 min. | 2.5 | 2.25 | 3.5 | 2.5 |
| t35 min. | >31 | 8.5 | >31 | 4.5 |

The fact that the $t_5$ and $t_{35}$ scorch times do not show any significant difference after eight weeks is indicative of the excellent shelf life.

EXAMPLE 2

This example further demonstrates the shelf stability of a vulcanizable composition. The following ingredients were uniformly mixed in a Banbury mixer at room temperature (25° C.).

| Ingredients | Parts by Weight Based Upon 100 phr |
|---|---|
| Polyacrylate rubber | 100 |
| Stearic acid | 1 |
| N550, FEF | 65 |
| Agerite Stalite S | 2 |
| Sodium Stearate | 4 |
| Cetyltrimethyl ammonium bromide | 1 |

Once the composition was uniformly mixed by a two-roll mill, the Mooney viscosity was determined using a large rotor at 85° C., 100° C., and 125°. Corresponding Mooney viscosity readings were taken every two weeks after room temperature aging for an eight week period. Further, a Rheometer oscillating disc test was run at 190° C. with a 3° arc. The minimum ($M_L$) point, maximum ($M_{HF}$) point, and cure point ($t_{90}$) were recorded. (Where unspecified later, the same test parameters are used). The results of the tests are set forth below.

| | MOONEY VISCOSITY (Large Rotor) | | | | |
|---|---|---|---|---|---|
| Test Week | 0 | 2 | 4 | 6 | 8 |
| 85° C. | | | | | |
| min. visc. | 73 | 65 | — | — | — |
| t5, (min.) | 27 | >30 | — | — | — |
| t35, (min.) | >>30 | >>30 | — | — | — |
| 100° C. | | | | | |
| min. visc. | 60 | 52 | 56 | 55 | 56 |
| t5, (min.) | 8.0 | 8.0 | 9.5 | 9.0 | 9.5 |
| t35, (min.) | 13.3 | 13.5 | 16.5 | 15.0 | 15.5 |
| 125° C. | | | | | |
| min. visc. | 51 | 45 | — | — | — |
| t5, (min.) | 2.5 | 2.5 | — | — | — |
| t35, (min.) | 3.5 | 3.5 | — | — | — |

Rheometer Microdie, 100 cpm, 3° Arc, 190° C.
$M_L$ (lbf-in)   7.5
$M_{HF}$ (lbf-in)  61.8
$t'_{90}$, min.   3.8

EXAMPLE 3

This example demonstrates a large number of ammonium or phosphonium quaternary salts having halogen or hydroxide reactive groups are temperature sensitive, i.e., are shelf stable below temperature range, but can cure with good mechanical and compression set properties without post curing being necessary so long as curing occurs within the threshold temperature range.

| A Master Batch | Level |
|---|---|
| Polyacrylate rubber having halogen and carboxyl dual cure sites | 100 parts by wt. |
| Stearic Acid (lubricant and retarder) | 1 |
| Struktol WB-222 (fatty soap, processing aid) | 2 |
| Philblack N 550 (carbon black, filler) | 65 |
| Stalite S (octylated diphenyl amine, antioxidant) | 2 |

The master batch was uniformly mixed in a Banbury mixer. 400 grams of the master batch was then blended with sodium stearate, 9.4 grams (4 parts), and cetyltrimethyl ammonium bromide, 2.35 grams (the equivalent of 1 part per 100 parts of polymer). The cetyltrimethyl ammonium bromide was replaced with other curatives set forth below. All curatives were used at the same molar level. Accordingly, depending upon the molecular weight of the curative, the curative would not necessarily be employed at 1 part per 100 parts of rubber as set forth for the cetyltrimethyl ammonium bromide.

The curatives employed were:
1. Cetyltrimethyl ammonium bromide,
2. Tetrabutyl ammonium chloride,
3. Tetrabutyl ammonium bromide,
4. Tetrabutyl ammonium iodide,
5. Tetraphenyl phosphonium bromide,
6. Hexadecyltributyl phosphonium bromide,
7. Tetramethyl ammonium hydroxide pentahydrate,
8. Cetyldimethylethyl ammonium bromide, 9. Tetraphenyl phosphonium chloride,
10. Tetraphenyl phosphonium iodide,
11. Tetrabutyl phosphonium chloride,
12. Tetrabutyl phosphonium bromide,
13. Cetyl trimethyl ammonium-p-toluenesulfonate,
14. Myristyltrimethyl ammonium bromide.

As soon as the curatives were uniformly blended with the master batch, a Rheometer microdie oscillating disc test was run at 100 cpm, 190° C. with 3° arc. The minimum ($M_L$) point, maximum ($M_{HF}$) point, and cure point ($t_{90}$), the time when 90% of the torque change was achieved, were recorded for the twelve curative systems. Additionally, a Mooney viscosity and a $t_5$ and $t_{35}$, in minutes, were conducted at 100° C. and 125° C. The results of those tests are as set forth below.

above data, it is clear that many different curatives can be employed and the processing time can be controlled by the use of retarders or greater or lesser amounts of the curative itself.

EXAMPLE 4

The original physical properties of the various compounds set forth in Example 3 are set forth in the table below. The physical properties were determined by curing the samples for four minutes at 190° C. and the compression set data was determined after 70 hours at 150° C. The first physical property, stress at 100 percent elongation, set forth is the amount of force per unit area (stress) necessary to stretch the vulcanized polymer to 100% of its original elongation according to ASTM D 412. The second physical property tested was its maximum tensile at break and the third physical property is the percent elongation at break, according to ASTM D 412. The next physical property tested is the hardness according to ASTM D 2240. The last physical property is the plied compression set according to ASTM D 395, method B.

| | | 1 | 2 | 3 | 4 | 5 | 6 | 7 | 8 | 9 | 10 | 11 | 12 |
|---|---|---|---|---|---|---|---|---|---|---|---|---|---|
| Rheometer | $M_L$ (lbf-in) | 7.4 | 8.1 | 11 | 8.7 | 7.0 | 9.0 | 9.8 | 10 | 9.8 | 5.8 | 10 | 13 |
| 190° C., 3°Arc | $M_{HF}$ (lbf-in) | 58 | 47.8 | 60.5 | 67 | 65 | 58.8 | 65.4 | 62.3 | 58 | 59.2 | 63.2 | 70.2 |
| | $t'_{90}$ (min.) | 4.8 | 7.4 | 3.5 | 1.5 | 6.0 | 5.0 | 8.8 | 3.5 | 11.8 | 8.0 | 11.5 | 3.4 |
| Mooney Viscometer (Large Rotor) | | | | | | | | | | | | | |
| 100° C. | Min. Visc. | 49 | 52 | 59 | 59 | 50.5 | 51.0 | 59 | 52 | 53 | 50.7 | 60.2 | 70.5 |
| | $t_5$ (min.) | 9.4 | 5.7 | 3.2 | 2.7 | 8.2 | 6.2 | 5.0 | 6.8 | 5.6 | >31 | 4.3 | 2.4 |
| | $t_{35}$ (min.) | 15.2 | 9.3 | 4.3 | 3.4 | 12.3 | 9.2 | 8.8 | 10.7 | 8.6 | 52* | | 3.6 |
| 125° C. | Min. Visc. | 40 | 45 | >200 | >200 | 39 | 45 | 56 | 45.5 | 45.7 | 34 | 60 | >200 |
| | $t_5$ (min.) | 2.5 | 2.0 | | | 3.2 | 2.2 | 1.8 | 2.3 | 2.2 | 8.3 | 1.6 | |
| | $t_{35}$ (min.) | 3.6 | 2.5 | | | 4.1 | 2.6 | 2.3 | 2.9 | 2.8 | 13.8 | 2.0 | |
| 100° C. Aged at Room Temp. 2 wks. | Min. Visc. | 46.0 | >200 | >200 | >200 | 60.2 | >200 | 121 | 55.0 | 73.4 | 47.0 | >200 | |
| | $t_5$ (min.) | 9.6 | | | | 4.8 | | 4.3 | 6.5 | 4.2 | 15.5 | | |
| | $t_{35}$ (min.) | 17.3 | | | | 7.3 | | | 11.1 | 6.4 | 29.4 | | |

| | | | 13 | 14 |
|---|---|---|---|---|
| Rheometer, microdie 100 cpm, 190° C., 3°Arc | | $M_L$ (lbf-in) | 6.1 | 8.4 |
| | | $M_{HF}$ (lbf-in) | 51.6 | 66.1 |
| | | $t'_{90}$ (min.) (min.) | 15.0 | 3.8 |
| Mooney Viscometer (Large Rotor) | | | | |
| 100° C. | | Min. Visc. | 49 | 54 |
| | | $t_5$ (min.) | >31 | 8.2 |
| | | $t_{35}$ (min.) | >31 | 12.5 |
| 125° C. | | Min. Visc. | 37.2 | 41.8 |
| | | $t_5$ (min.) | 3.6 | 2.2 |
| | | $t_{35}$ (min.) | 5.5 | 2.8 |
| 125° C. Aged at Room Temp. 2 wks. | | min. vis. | 36 | 44 |
| | | $t_5$ (min.) | 3.4 | 2.6 |
| | | $t_{35}$ (min.) | 5.3 | 3.3 |

As is evident from the above Examples, some of the curatives were quicker than others. The curatives which vulcanize quickly could be employed along with a retarder to slow down the curing time such that there is a longer processing time. The curatives which have a slow processing time could be employed in amounts greater than employed in this example so that the processing time could be greatly reduced. Based upon the

| Batch | Stress at 100% Elongation (PSI) | Ultimate Tensile Strength (PSI at Break) | Ultimate Elongation (Percent) | Hardness Durometer A | Compression, Plied, % (70 Hrs. at 150° C.) |
|---|---|---|---|---|---|
| 1 | 700 | 1720 | 210 | 67 | 39 |

-continued

| Batch | Stress at 100% Elongation (PSI) | Ultimate Tensile Strength (PSI at Break) | Ultimate Elongation (Percent) | Hardness Durometer A | Compression, Plied, % (70 Hrs. at 150° C.) |
| --- | --- | --- | --- | --- | --- |
| 2 | 460 | 1490 | 300 | 63 | 62 |
| 3 | 630 | 1620 | 210 | 63 | 29 |
| 4 | 800 | 1810 | 190 | 65 | 19 |
| 5 | 725 | 1725 | 200 | 68 | 40 |
| 6 | 600 | 1450 | 270 | 63 | 38 |
| 7 | 700 | 1825 | 200 | 65 | 42 |
| 8 | 700 | 1700 | 200 | 67 | 30 |
| 9 | 550 | 1460 | 270 | 65 | 62 |
| 10 | 710 | 1835 | 190 | 72 | 43 |
| 11 | 550 | 1560 | 270 | 63 | 50 |
| 12 | 740 | 1740 | 200 | 63 | 29 |
| 13 | 1060 | 1400 | 300 | 68 | 73 |
| 14 | 920 | 1740 | 180 | 69 | 31 |

Based on Rheometer data, Mooney scorch, aging data and original physical properties, the cetyltrimethyl ammonium bromide and cetyldimethylethyl ammonium bromide provided the best balance of properties for the master batch formulation. Again, however, these properties will vary by employing retarders, etc. to prevent scorchiness and prevulcanization.

EXAMPLE 5

The cetyltrimethyl ammonium bromide was employed to determine the Mooney scorch time as a function of temperature. The minimum viscosity, the $t_5$ value, $t_{35}$ value and viscosity at 31 minutes were determined for the cetyltrimethyl ammonium bromide at various temperatures as set forth below.

| Temp. °C. | Mooney Viscometer, Large Rotor | | | | | | |
| --- | --- | --- | --- | --- | --- | --- | --- |
| | 70° | 80° | 85° | 90° | 93° | 100° | 125° |
| Min. Visc. | 81.0 | 71.6 | 60.3 | 54.9 | 58.0 | 54.7 | 46.7 |
| $t_5$ (min.) | >31 | >31 | >31 | 22.8 | 22.8 | 8.7 | 2.8 |
| $t_{35}$ (min.) | >31 | >31 | >31 | >31 | >31 | 15.1 | 3.7 |
| Visc. at 31 minutes | 81.0 | 72.0 | 62.2 | 67.0 | 84.2 | | |

Based upon the above results, the cetyltrimethyl ammonium bromide in a master batch formulation having 1 part of retarder incorporated therein will begin curing in a temperature range of about 85° C. to 90° C. Below this range the cetryltrimethyl ammonium bromide as a curative appears to be substantially inactive.

A similar test was performed substituting tetramethyl ammonium hydroxide pentahydrate for the cetyltrimethyl ammonium bromide. The minimum viscosity, $t_5$ value, $t_{35}$ value and viscosity at 31 minutes were determined at various temperatures as set forth below.

| Temp. °C. | Mooney Viscometer, Large Rotor | | | | |
| --- | --- | --- | --- | --- | --- |
| | 75° C. | 80° C. | 85° C. | 100° C. | 125° C. |
| Min. Visc. | 71 | 66 | 62 | 59 | 56 |
| $t_5$ (min.) | — | 22.2 | 15.9 | 5 | 1.8 |
| $t_{35}$ (min.) | — | — | — | 8.8 | 2.3 |
| Visc. at 31 min. | 74 | 74 | 76 | — | — |

Based on the forgoing results, a threshold temperature at which curing begins is evidenced. The criterion for the temperature range at which curing starts is a 5 point or greater rise in the Mooney viscosity after 31 minutes. The threshold temperatures for selected curatives are shown below.

| Curative | Threshold Temperature Range °C. |
| --- | --- |
| Tetraphenylphosphonium bromide | 80–85 |
| Tetramethyl ammonium hydroxide pentahydrate | 75–80 |
| Cetyldimethylethyl ammonium bromide | 80–85 |
| Tetraphenylphosphonium chloride | 75–80 |

EXAMPLE 6

An example was run using the same procedure and recipe as in Example 3 using cetyltrimethyl ammonium bromide except that potassium stearate was substituted for the sodium stearate.

| Rheometer 100 cpm, 190° C., 3° Arc | $M_L$ | 8.8 |
| --- | --- | --- |
| | $M_{HF}$ | 54.1 |
| | $t'_{90}$ (min.) | 5.2 |
| Mooney Viscometer (Large Rotor) 100° C. | Min. Visc. | 50 |
| | $t_5$ (min.) | 5.5 |
| | $t_{35}$ (min.) | 10.0 |
| Compression set Plied (%), 70 hours at 150° C. | | 37 |

EXAMPLE 7

The following examples demonstrate the one-component curative system. A master batch having a recipe corresponding to that used in Example 3 (except no stearic acid was added) was uniformly mixed in a Banbury mixer. To this masterbatch was added 2 parts tetrabutyl ammonium stearate per 100 parts polyacrylate. Mooney viscosity was determined for the sample using the large rotor at 125° C. A Rheometer oscillating disc test was run using a microdie at 100 cpm, 190° C. with a 3 degree arc. Physical properties were determined on samples which had been cured for four minutes at 190° C. In addition, compression set was determined on the cured sample after 70 hours at 150° C. The test results are set forth below.

| Mooney Viscometer, Large Rotor, 125° C. | |
| --- | --- |
| Min. Visc. | 73 |
| $t_5$ (min.) | 1.6 |
| $t_{35}$ (min.) | 2.0 |
| Rheometer, Microdie, 100 cpm, 3° Arc, 190° C. | |
| $M_L$ (lbf-in) | 14.5 |
| $M_{HF}$ (lbf-in) | 52.5 |
| $t'_{90}$ (min.) | 16.5 |

-continued

| Original Physical Properties, Cured 4 min. at 190° C. | |
|---|---|
| M100 (psi) | 400 |
| Ultimate Tensile Strength (psi at break) | 1700 |
| Ultimate Elongation (percent) | 300 |
| Hardness Durometer A | 60 |
| Compression Set, 70 hours at 150° C. | |
| % Plied | 80 |

Thus, it is apparent that there has been provided, in accordance with the invention, a method that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A no-post-cure method of curing polyacrylate rubber having halogen and carboxy cure sites, comprising:

mixing an effective amount of a curative with said polyacrylate rubber until a uniform vulcanizable composition results:

said acrylate rubber comprising (a) from about 40 percent to about 99.8 percent by weight of an acrylate of the formula:

$$CH_2=CH-\overset{O}{\underset{\|}{C}}-O-R$$

wherein R is selected from the group consisting of an alkyl radical containing 1 to 18 carbon atoms, an alkoxyalkyl, an alkylthioalkyl, and a cyanoalkyl radical containing 2 to 12 carbon atoms; (b) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen group; (c) from about 0.1 percent to about 20 percent by weight of a carboxyl-containing monomer; and (d) up to about 35 percent by weight of a copolymerizable monomer containing a terminal vinylidene group; said curative comprising a metallic stearate and a quaternary salt selected from the class consisting of an ammonium quaternary halogen salt, an ammonium quaternary hydroxide salt, a phosphonium quaternary halogen salt, and a phosphonium quarternary hydroxide salt;

processing said composition and maintaining said composition below an activation temperature range prior to a curing step whereby said composition does not undergo any substantial amount of cure prior to said curing step, said activation temperature range being form about 75° C. to about 85° C.,; and heating during said curing step said composition to above an activation temperature range which causes said composition to substantially cure whereby no-post-curing is necessary and whereby said process permits large scale commercial production.

2. A no-post-cure method of curing polyacrylate rubber having halogen and carboxyl cure sites, comprising:

mixing an effective amount of a curative with said polyacrylate rubber until a uniform vulcanizable composition results, said acrylate rubber comprising (a) from about 40 percent to about 99.8 percent by weight of an acrylate of the formula:

$$CH_2=CH-\overset{O}{\underset{\|}{C}}-O-R$$

wherein R is selected from the group consisting of an alkyl radical containing 1 to 18 carbon atoms, an alkoxyalkyl, an alkylthioalkyl, and a cyanoalkyl radical containing 2 to 12 carbon atoms; (b) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen group; (c) from about 0.1 percent to about 20 percent by weight of a carboxyl-containing monomer; and (d) up to about 35 percent by weight of a copolymerizable monomer containing a terminal vinylidene group, said curative comprising a metallic acid salt and a quaternary salt, said metallic acid salt being selected from the group consisting of carboxylic acids containing from 2 to about 24 carbon atoms and organophosphoric acids of the formula $$(R-O)_z PO_y M$$

where M is an alkali metal, y equals 1 or 2, z equals 1 or 2, and y plus Z equals 3, and R is selected from the group consisting of alkyl radicals containing from 1 to about 24 carbon atoms, and aryl radicals containing from 6 to about 24 carbon atoms and said quaternary salt being selected from the group consisting of an ammonium or phosphonium quaternary salt of an anion X where X is an anion of an organic or inorganic acid wherein the acidic hydrogen is associated with a halogen or an oxygen atom;

processing said composition and maintaining said composition below an activation temperature range prior to a curing step whereby said composition does not undergo any substantial amount of cure prior to said curing step, said activation temperature range being from about 75° C. to about 85° C.,; and heating during said curing step said composition above an activation temperature range which causes said composition to substantially cure whereby no-post-cure is necessary, and whereby said process permits large scale commercial production.

3. A no-post-cure method of curing polyacrylate rubber having halogen and carboxyl cure sites, comprising:

mixing an effective amount of a curative with said polyacrylate rubber until a uniform vulcanizable composition results, said acrylate rubber comprising (a) from about 40 percent to about 99.8 percent by weight of an acrylate of the formula:

wherein R is selected from the group consisting of an alkyl radical containing 1 to 18 carbon atoms, an alkoxyalkyl, an alkylthioalkyl, and a cyanoalkyl radical containing 2 to 12 carbon atoms; (b) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen group; (c) from about 0.1 percent to about 20 percent by weight of a carboxyl-containing monomer; and (d) up to about 35 percent by weight of a copolymerizable monomer containing a terminal vinylidene group, said curative comprising a metallic acid and a quaternary salt, said metallic acid salt being selected from the group consisting of carboxylic acids containing from 2 to about 24 carbon atoms and organophosphoric acids of the formula

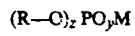

where M is an alkali metal, y equals 1 or 2, z equals 1 or 2, and y plus Z equals 3, and R is selected from the group consisting of alkyl radicals containing from 1 to about 24 carbon atoms and aryl radicals containing from 6 to about 24 carbon atoms and said quaternary salt being selected from the group consisting of an ammonium or phosphonium quaternary salt of an anion X where X is an anion of an organic or inorganic acid wherein the acidic hydrogen is associated with a halogen or an oxygen atom, said mixture having threshold temperature characteristics, said threshold temperature characteristics including a first area of uncured low minimum viscosity change being a change of less than 150 Mooney units measured at 100° C. after a two week room temperature aging, said second area being a threshold temperature range being the temperature at which time t₅ value as measured by the Mooney Viscometer Large Rotor Test ASTM D1646 rises 5 points or more in 31 minutes and a third cured area where the cured composition has a cured completion as measured by plied, compression set ASTM D395 after 70 hours at 150° C. of equal to or less than 80 percent; and heating said composition above an activation temperature range, said activation temperature range being from about 75° C. to about 85° C., which causes said composition to substantially cure whereby no-post-cure is necessary and whereby said process permits large scale commercial production.

4. The method of claim 1 wherein said curative is present from about 0.1 to about 25 parts by weight per 100 parts by weight of the rubber.

5. The method of claim 2 wherein said curative is present from about 0.1 to about 25 parts by weight per 100 parts by weight of the rubber.

6. The method of claim 3 wherein said curative is present from about 0.1 to about 25 parts by weight per 100 parts by weight of the rubber.

7. The method of claim 1, further including the step of storing said composition below said activation temperature range after said mixing step and before said heating step, said storing step does not destroy the shelf stability of said composition.

8. The method of claim 1, wherein said acrylate rubber comprises: (a) from about 65% to about 99.6% by weight of an acrylate, wherein R is selected from the group consisting of alkyl radicals containing 1 to about 10 carbon atoms and alkoxyalkyl radicals containing 2 to about 8 carbon atoms; (b) from about 0.2% to about 15% by weight of a halogen-containing monomer; (c) from about 0.2 to about 10% by weight to a carboxyl containing monomer; and (d) up to about 10% by weight of a copolymerizable monomer containing a terminal vinylidene group.

9. The method of claim 8, wherein (a) is selected from the group consisting of ethyl acrylate, n-butyl acrylate, methoxyethyl acrylate, and ethoxyethyl acrylate; (b) is selected from the group consisting of vinyl chloroacetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene; (c) is selected from the group consisting of acrylic acid, methacrylic acid; and itaconic acid; and (d) is selected from the group consisting of vinyl acetate, methyl methacrylate, ethyl methacrylate, styrene, acrylonitrile, acrylamide, and diethylene glycol diacrylate.

10. The method of claim 1, wherein said curative comprises from about 0.5 parts to about 25 parts by weight based upon 100 parts by weight of the rubber, of a quaternary salt of the formula:

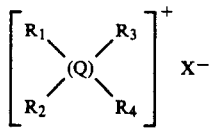

wherein Q is nitrogen or phosphorous, $R_1$, $R_2$, $R_3$, and $R_4$ are hydrocarbon radicals, containing 1 to about 18 carbon atoms such as alkyl, aryl, alkaryl, aralkyl radicals, or wherein two or three of the $R_1$, $R_2$, $R_3$, and $R_4$ form with nitrogen or phosphorous atom a heterocyclic structure containing 3 to 8 atoms selected form the group consisting of carbon, nitrogen, oxygen and sulfur, wherein at least two atoms are carbon; and X is an ion such as chloride (Cl⁻), bromine (Br⁻), iodine (I⁻), or hydroxide (OH⁻).

11. The method of claim 1, wherein said metallic stearate is selected from the class consisting of sodium stearate or potassium stearate.

12. The method of claim 10, wherein said quaternary ammonium salts are selected from the class consisting of tetramethyl ammonium chloride, tetramethyl ammonium bromide, trimethylethyl ammonium iodide, trimethylsoya ammonium chloride, trimethylcetyl ammonium bromide, trimethylbenzyl ammonium chloride, dimethylethylcetyl ammonium chloride, dimethyloctylbenzyl ammonium chloride, dimethyloleybenzyl ammonium chloride, dimethyloctadecylbenzyl ammonium chloride, dimethylphenylbenzyl ammonium bromide, dimethyldibenzyl ammonium bromide, methylethylpropylisobutyl ammonium chloride, (tetradecyl)trimethyl ammonium chloride, methylcetyldibenzyl ammonium bromide, cetylpyridinium chloride, dodecylpyridinium bromide, tetrabutyl ammonium chloride, tetrabutyl ammonium bromide, tetrabutyl ammonium iodide, tetramethyl ammonium hydroxide pentahydrate, cetyldimethylethyl ammonium bromide, and myristyltrimethylammonium bromide.

13. The method of claim 10, wherein said quaternary phosphonium salts are selected from the class consisting of tetraphenyl phosphonium bromide, hexadecyltributyl phosphonium bromide, tetraphenyl phosphonium chloride, tetraphenyl phosphonium iodide, tetrabutyl phosphonium chloride, tetrabutyl phosphonium bromide, triphenylbenzyl phosphonium chloride, triphenylbenzyl phosphonium bromide, triphenylbenzyl phosphonium iodide, triphenylmethoxymethyl phosphonium chloride, triethylbenzyl phosphonium chloride, and tricyclohexylbenzyl phosphonium chloride.

14. A method of claim 2 wherein X is selected from the group consisting of $Cl^-$, $Br^-$, $I^-$, $HSO_4^-$, $H_2PO_4^-$, $RCOO^-$, $ROSO_3^-$, $RSO_3^-$, and $ROPO_3H^-$ where R is an alkyl or alkaryl radical containing 1 to 18 carbon atoms.

15. A method of claim 3, wherein said threshold temperature characteristics include a first area of uncured low minimum viscosity change being a change of less than 150 Mooney units measured at 100° C. after a two week room temperature aging, a second area of curing at the threshold temperature range and a third cured area where the cured composition has a cure completion measured by plied, compression set ASTM D395 after 70 hours at 150° C. of equal to or less than 80%.

16. A method of claim 15, wherein said first area of uncured low minimum viscosity change is a change of less than 5 Mooney units measured at 100° C. after an eight week room temperature aging and said third cured area has a cure completion as measured by compression set equal to or less than 40%.

* * * * *